United States Patent Office 3,239,736
Patented Mar. 8, 1966

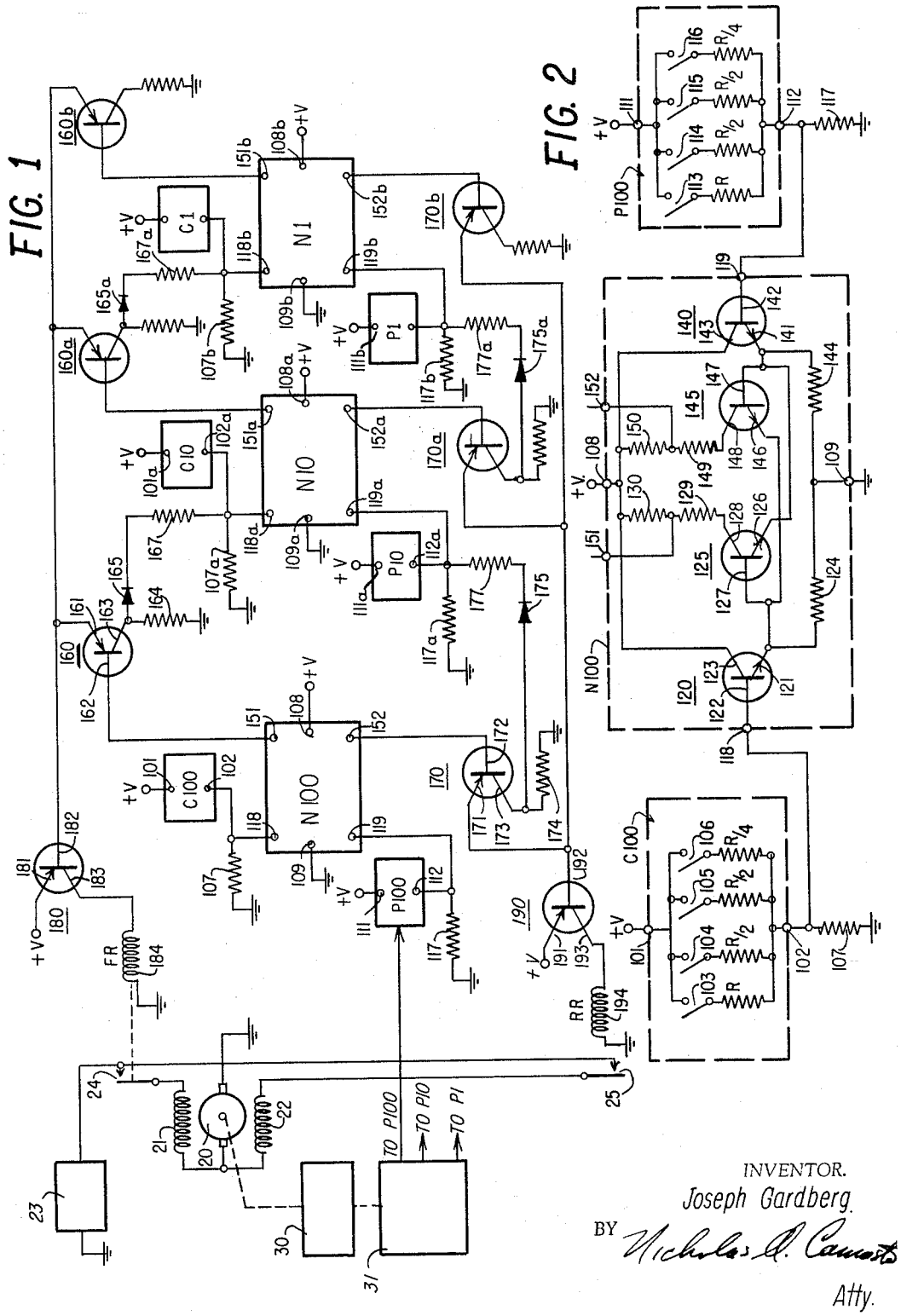

3,239,736
DIGITAL POSITIONAL CONTROL SYSTEM
Joseph Gardberg, 6331 N. Francisco,
Chicago, Ill. 60645
Filed Aug. 30, 1963, Ser. No. 305,661
7 Claims. (Cl. 318—28)

This invention concerns nulling arrangements generally and in particular nulling circuits for motor control systems in which a high degree of positioning accuracy is desired. In its broader aspects, the present invention represents an improvement over a prior control system of the inventor which is fully described in a copending application Serial Number 273,879, filed April 18, 1963.

The invention described in the above mentioned copending application discloses a nulling circuit which possesses a number of distinct advantages over those in the prior art. Primarily the circuit arrangement affords the same degree of positioning accuracy to the least significant portion of the control signal as it does to the most significant portion. This is accomplished by converting each informational group of the encoded command and position signals into electrical analogs. In the described embodiment of the invention, both in the present and in the above mentioned copending application, the informational groups of the encoded signals are digital and the nulling circuit is effective to sequentially null differences between the command and position analogs on a digit by digit basis.

The same philosophy is utilized in the circuit of the present invention, namely that of successive nulling on an informational group basis. However, in the circuit of the present invention, a number of additional advantages are obtained. By way of example and not limitation, the circuit of the invention eliminates the necessity for an additional power supply. (The circuit of the copending application utilized both a positive and a negative source of potential.) The present invention also yields larger potentials during the nulling process which allows the use of less critical circuitry. A further, major advantage, where a very precise positioning or counting function is desired, is that accuracy is maintained in spite of voltage fluctuations in the power source without the need for expensive regulated power supplies. In the dual polarity system of the above copending application, a change in magnitude of one polarity voltage may not be accompanied by a compensatory magnitude change in the other polarity voltage with the result that the null or zero level may not remain stationary.

Briefly, the present invention is described in the environment of a motor control system in which a bidirectional motor is drivingly coupled to a controlled device for driving said controlled device through a plurality of discrete positions. Position responsive means are utilized to yield an exact indication of the position of the controlled device throughout its travel. The position information is in the form of an encoded signal, in the described embodiment this takes the form of binary coded digital information, which is converted into an electrical analog.

Similarly a command signal register is operable to yield an encoded signal of similar form which is indicative of the position desired for said controlled means. The command signal may be generated in any of a number of well known ways. The command signal is likewise converted to an electrical analog and the two analogs are compared in a nulling circuit on an informational group basis, in the chosen environment, on a digit by digit basis. The error signals generated in the nulling circuits are utilized to control the operation of the motor which drives the controlled means towards the position indicated in the command signal register. Coincidence is achieved between the information in the command signal register and the position register when the controlled device occupies the position dictated by the command signal. At this juncture, all of the nulling circuits experience a null and the control system is in equilibrium.

To illustrate, assume a three digit decimal signal is utilized to fully describe the position of the controlled means. Similarly, the output of the command signal register will also comprise a three digit decimal signal. The initial digit, for example, describes the position in the least precise terms (it is the most significant figure), whereas successive digits describe the position with increasing degrees of precision (less significant figures). The digits are compared individually with their counterparts of similar degree of significance, beginning with the most significant, and the error signals developed are used to control the motor operation until each digit in the position register is the same as the corresponding digit in the command register. It will be noted that the magnitude of the error signal is determined by the relative sizes of the individual digits being compared and is not related to the degree of significance of the digits being compared.

It will be readily apparent from the above that the inventive concept need not be limited to a motor control system, but is applicable to numerous environments in which it is desired to compare one group of data with another, as is common in reading out information in storage registers, counters, etc.

Accordingly, it is an object of this invention to provide a nulling arrangement having a very high degree of accuracy but which does not require critical circuitry.

A further object of this invention is to provide a highly accurate nulling arrangement which does not require elaborate power supply regulation to maintain its accuracy.

An additional object of this invention is to provide a motor control positioning system of high accuracy of the type described which utilizes only a single polarity potential source.

Additional objects and advantages of this invention will be apparent to those skilled in the art by a reading of the following detailed description in conjunction with the drawings in which:

FIG. 1 is a partial block and partial schematic diagram of a motor control system incorporating the invention, and FIG. 2 is a detailed schematic of the nulling circuit and associated registers of a portion of the circuit of FIG. 1.

Referring now to FIG. 1, there is shown a bidirectional motor 20 having windings 21 and 22 connectable through a pair of relay contacts 24 and 25, respectively, to a source of potential 23. The shaft of motor 20 is shown coupled by a dashed line to a pair of blocks 30 and 31. Block 30 is a controlled means, the position of which it is desired to control. Block 31 represents a position readout device, the function of which is to yield encoded digital information for every discrete position of controlled means 30. Numerous such devices are known in the art, and in particular block 31 may contain structure corresponding to elements 27, 28 and 32 in FIG. 1 of the above mentioned copending application. The three lines emanating from block 31 indicate that control is exerted over blocks P100, P10 and P1.

At this point, it may be well to note that the notation P100 indicates that this block is the position register for the digital information corresponding to the "hundreds" position. Similarly blocks C100 and N100 represent the command register and nulling circuit, respectively for the "hundreds" position.

Position register P100 has a terminal 111 connected to a source (not shown) of positive voltage +V and a terminal 112 connected through a resistor 117 to ground. Terminal 112 is also connected to terminal 119 on block N100, which is the nulling circuit for the "hundreds" position.

N100 has a pair of terminals 108 and 109 connected to +V and ground, respectively. Terminal 118 of N100 is connected to terminal 102 of C100 (the command register for the "hundreds" position) and terminals 151 and 152 are connected respectively to the bases 152 and 172 of forward control transistor 160 and reverse control transistor 170.

Unnecessary repetition will be avoided by noting that each position has similar structure associated therewith. For instance, in the "tens" position the position register is P10, the command register C10, the null circuit N10. The forward control transistor in this position is transistor 160a and the reverse control transistor is 170a. Likewise the units position is characterized by the notations P1, C1, and N1 for the blocks and the subscripts b for corresponding elements to those enumerated for the other positions.

It may be seen that each position has associated with it a position register, a command register, a null circuit and a forward and reverse control transistor. Since in all essential respects these elements function in the same manner, their operation will be described in detail for a single position only.

The terms forward and reverse have been chosen since they are readily associated with a bidirectional motor drive system. Thus the upper portion of FIG. 1 may be considered a forward translation channel and the lower portion a reverse translation channel. The emitters of the forward control transistors 160, 160a and 160b are all connected to the base 182 of a forward drive transistor 180. Similarly the emitters of the reverse control transistors 170–170b are connected to base 192 or reverse drive transistor 190. The emitter 181 of transistor 180 is connected to +V and its collector 183 is connected through winding 184 of forward relay FR. Relay winding 184 controls operation of relay contacts 24, which when closed energize motor 20 for rotation in the forward direction.

A similar arrangement is provided for the reverse translation channel with winding 194 of reverse relay RR being connected as the collector load of transistor 190. Relay winding 194 controls the operation of contacts 25, which when closed energize motor 20 for rotation in the reverse direction.

Before proceeding with the operation of the circuit of FIG. 1, it may be helpful to turn to FIG. 2 which is a schematic diagram of the blocks C100, N100 and P100. The delineations of the various blocks are indicated by the appropriately labelled dashed line enclosures. While the physical arrangement of the blocks has been changed from that shown in FIG. 1 for ease of description, no difficulty will be experienced if the terminal markings are observed. Also, for the sake of simplicity and because the structure does not form part of the invention, a series of simple switches 103–106 and 113–116 have been shown in the command and position registers, respectively. In practice these switches may take the form of semiconductor flip-flop circuits, or other devices, in which case appropriate provisions for biasing and resetting must be provided.

Both the command and position registers are the same and comprise a plurality of resistors connectable between terminals 101 and 102 by switches 103–106 (referring specifically to the command register). The command register switches may be manually operated to produce an electrical analog of a binary coded decimal digit. Consequently the resistors have values of R, R/2 and R/4. The conventional binary values of R, R/2, R/4 and R/8 are unnecessary since the register need only reflect a 0 to 9 indication and economy is achieved by reducing the number of resistor values required. Terminal 102 is thus seen to be at the junction of a voltage divider connected between +V and ground and the magnitude of the potential appearing thereon is determined by which ones of the switches 103–106 are closed. If the digit "1" is registered, switch 103 is closed. The potential at the junction of the voltage divider (terminal 102) is thus dependent upon the digit registered and is zero for the digit "0" and maximum for the digit "9."

The position register operates in a like manner with the exception that the switches 113–116 are operated responsive to position readout means 31. Thus the potential at terminal 112 will vary from zero to a maximum depending upon the value of the digit registered in position register P100.

Nulling circuit N100 includes four transistors 120, 125, 140 and 145. Terminal 108 is connected to +V and terminal 109 is grounded. All of the transistors in the nulling circuit are of the NPN type and are driven conductive responsive to their bases being driven positive with respect to their emitters. Emitter 121 of transistor 120 is connected to base 127 of transistor 125, to emitter 146 of transistor 145 and to a resistor 124, the other terminal of which is grounded. The emitter of transistor 140 is connected to the base of transistor 145, to the emitter of transistor 125 and to ground through resistor 144. The collectors of transistors 120 and 140 are connected to terminal 108 directly and the collectors of transistors 125 and 145 are connected to terminal 108 through serially connected resistors 129–130 and 149–150, respectively.

Assume a positive potential exists at terminal 102 in the command register (with respect to terminal 112 in the position register). Transistor 120, which is an emitter follower, is driven into conduction and a positive potential appears at the junction of its emitter 121 and resistor 124. Base 127 of transistor 125 is thus made positive with respect to its emitter 126 and transistor 125 is driven into conduction. Since the emitters and bases of transistors 125 and 145 are cross connected, conduction in either transistor prevents conduction in the other. Thus conduction in transistor 125 prohibits conduction in transistor 145, and since emitter 126 assumes a more positive potential, also inhibits conduction in transistor 140.

It will be noted that the current through resistors 124 and 144 is a function of the voltage developed as a result of the magnitude of the digits stored in the respective registers. Thus a large (approximately one to nine) current change occurs in progressing from a count of one to nine. This great change is a varying load on the junctions 102 and 112 which furnish the base currents of the emitter followers 120 and 140.

If resistors 129 and 144 are returned to a negative voltage several times the positive supply the change of current through them will be reduced. Thus if the total swing of voltage at resistors 102 and 112 is from 0 to 12 v. and the negative supply is —12 v. then the change ratio is only 2/1. As this supply is small and unregulated the added cost is practically negligible.

Similarly, a constant current source may be utilized to reduce the current drain on the voltage sensitive junctions 102 and 112 to a minimum. These modifications are not a part of the invention itself, but represent good circuit technique which is well known to those skilled in the art.

Terminal 151 is connected to the junction of collector resistors 129 and 130 of transistor 125 and is normally at +V potential. Upon conduction in transistor 125, however, terminal 151 swings in the negative direction, that is its potential becomes much less positive. As will be shown later, this potential swing is utilized to energize the forward translation channel and causes the motor to be rotated in the forward direction.

It will immediately be seen that the potentials existing at terminals 102 and 112 of the registers will differ, if at all, by approximately integral multiples of a discrete voltage. This discrete voltage will be the voltage change produced at either terminal by the introduction of the digit "1" into the register. This voltage may be made large if desired, consistent of course with the voltage limitations of the transistors used, and consequently nulling may be accurately achieved without critical circuitry.

As the controlled means is being driven toward the position dictated by the information in command register C100, the potential of terminal 112 on the position register will increase in discrete steps. The potential at emitter 141 of transistor 140 (developed across resistor 144 by the emitter current of transistor 125), is the potential at point 102 less the base-emitter voltage drop of transistors 120 and 125. By selection of the discrete voltage above mentioned to be substantially larger than the largest base-emitter voltage drop combination, transistor 140 will be prohibited from conduction. At the moment that the digital information in both registers is the same, equal potentials appear at terminals 102 and 112 and both transistors 125 and 145 are nonconductive. Because of their cross connections both transistors 125 and 145 cannot be conductive at the same time, hence energization of both the forward and reverse translation channels simultaneously cannot occur. The emitter follower transistors 120 and 140 are incorporated to provide large currents with which to work and are not essential to the invention.

If the digital information in the position register were greater than that indicated by the command register, transistor 145 would be driven into conduction and terminal 152 would experience a decrease in voltage. This decrease in voltage would energize the reverse translation channel and cause the motor to rotate in the reverse direction.

Returning now to FIG. 1, terminal 151 is seen to be connected to base 162 of forward control transistor 160. Its emitter 161 is connected through the base emitter circuit of forward drive transistor 180 to +V. The voltage decrease at terminal 151 drives transistor 160 into conduction. The potential on emitter 161 drops slightly whereupon transistor 180 is driven into conduction. The action is instantaneous and the collector-emitter current of transistor 160 is the input current for transistor 180. When transistor 180 conducts, winding 184 of forward relay FR is energized and closes contacts 24 which allows energization of winding 21 of motor 20.

Transistor 160 in conducting develops a positive potential across its collector resistor 164. This positive potential is communicated through diode 165 and resistor 167 to junction 102a of the next command register C10. The values of resistors 164 and 167 are chosen such that under this condition the potential across resistor 107a will be greater than the largest potential that can appear across its corresponding resistor 117a in position register P10. This feature is essential since nulling is carried out on a digit by digit basis and while the first digit is being nulled, subsequent position registers will repeatedly reflect changes in stored digits. If the feature were not incorporated, simultaneous energization of both the forward and reverse translation channels would periodically occur which would seriously hamper the usefulness of the entire system.

Thus the positive potential applied to terminal 102a of C10 maintains the corresponding transistors 120a and 125a (not shown) conductive and terminal 151a experiences a voltage decrease causing conduction in forward control transistor 160a. Likewise, the positive potential developed across the collector resistor of transistor 160a is communicated via diode 165a and resistor 167a to preclude energization of the reverse translation channel by the next position register P1.

When the digital information in C100 and P100 is brought into coincidence, transistor 160 is rendered non-conductive and the positive potential applied through diode 165 is removed, whereupon command register C10 assumes control of the system. When the digital information in P10 is brought into coincidence with that in C10, command register C1 assumes control. When complete coincidence is achieved, none of the forward control transistors are in conduction and forward drive transistor 180 stops conducting, thus terminating operation of motor 20.

Similar operation obtains if initially the digital information in the P100 register were greater than that in the C100 register, with the exception that the reverse control transistors and reverse drive transistor are conductive and the forward channel inhibited. Thus, the direction of motor travel is determined by the relative position of the controlled means with respect to the desired position dictated by the command signal registers.

The system will be seen to be relatively uncritical as to circuitry, due in large measure to the large error signals which may readily be developed for control purposes, requires only a single polarity of power supply potential and has no need for elaborate power supply regulation. Since the entire control circuit is fed from a single power supply point, any minor variations in the value of this potential will not affect the zero level of the system and will hence not affect its positioning accuracy.

Thus the system of the invention is seen to provide a highly accurate nulling arrangement which is uncritical as to circuitry, and requires only a single polarity unregulated power supply. It will be understood that numerous modifications and variations in the described embodiment and environment of the invention may be readily envisioned by those skilled in the art without departing from its true spirit and scope as defined in the following claims.

What is claimed is:

1. A nulling arrangement for nulling on a group by group basis two signals each of a type including a plurality of distinct informational groups comprising: first means to be conditioned; position means coupled to said first means and yielding a signal of said type which is indicative of the condition of said first means; a single source of potential; means in said position means coupled to said source of potential for converting said signals into electrical analogs wherein each group is translated into a single polarity potential whose magnitude is representative of the information therein; command signal means yielding an electrical analog corresponding to a desired condition of said first means; nulling means coupling said position means and said command signal means and comparing the magnitudes of the potentials between respective groups of said analogs, said nulling means including a pair of transistors, having their input circuits cross connected such that conduction in one of said transistors inhibits conduction in the other of said transistors, for developing error signals representative of differences between said analogs; and translation means for conditioning said first means in accordance with said error signals until said error signals disappear, whence the condition of said first means corresponds to the desired condition dictated by said command signal means.

2. In combination: means producing a first signal; means producing a second signal to be brought into coincidence with said first signal; means developing first and second electrical analogs from said first and second signals respectively; said analogs being characterized by the same polarity but having magnitudes related specifically to the informational content of said signals; means comparing said analogs and developing like polarity error signals in accordance with differences in magnitudes between said analogs, said last mentioned means including a pair of like conductivity type semiconductors having their inputs cross connected in a manner such that only one of said semiconductors may be driven conductive at any given time, said analogs being applied to respective ones of the input circuits of said semiconductors whereby the larger magnitude analog drives its associated one of said semiconductors into conduction; and means selectively responsive to conduction in said semiconductors for controlling said means producing said second signal.

3. A control system for controlling the condition of controlled means comprising: condition responsive means yielding an encoded signal containing discrete informational groups representative of the condition of said controlled means; command signal means yielding a similar type encoded signal representative of a desired condition of said controlled means; means converting each informational group of said encoded signals into an electrical analog having a given polarity, and a magnitude that is a function of its informational content, said analogs being developed by selectively connecting voltage divider impedance combinations across a power supply of said given polarity; semiconductor switch means including mutually exclusive conductive elements operable dependent upon the relative magnitudes of corresponding informational groups of said analogs and developing error signals therefrom; and means coupled to said controlled means and sequentially rendered responsive to said error signals for changing the condition of said controlled means until all said error signals are eliminated.

4. A control system as set forth in claim 3 wherein said mutually exclusive conductive elements comprises a pair of transistors of similar conductivity type each connected to respective ones of corresponding informational groups of said analogs, said transistors having their input circuits cross connected such that signals tending to drive one of said transistors conductive automatically tend to drive the other of said transistors nonconductive.

5. A nulling arrangement comprising: a command register; a position register; a nulling circuit; a single polarity unregulated power supply; controlled means; means coupling said controlled means to said position register and developing an encoded signal as a function of the position of said controlled means, said encoded signal including at least two informational groups of differing degrees of significance; means in said position register, under control of said last mentioned means, selectively connecting different impedance element combinations across said power supply to thereby produce an electrical analog of said encoded signal; means in said command register producing a similar encoded signal and electrical analog corresponding to a desired position for said controlled means; said electrical analogs including a corresponding number of informational groups and being characterized by the same polarity but differing magnitudes dependent upon the respective actual and desired position of said controlled means; comparing means comparing the magnitudes of corresponding pairs of informational groups of said analogs and developing error signals representative of differences therebetween, said comparing means comprising; a pair of transistors for each informational group, each said pair of transistors having cross connected input circuits whereby only one transistor of each said pair may be conductive at any given time, means coupling respective informational groups of said analogs to said transistor pairs; control means responsive to said error signals for changing the position of said controlled means; and means rendering said control means responsive to successive ones of said error signals in accordance with said degrees of significance.

6. A motor control system comprising: a motor; position means coupled to said motor yielding a plurality of distinct coded digital signals for a corresponding plurality of positions of said position means; a single polarity power supply; means including said power supply converting said coded digital signals into a corresponding series of electrical signals all of the same polarity; motor control means including an amplifier for controlling energization of said motor; command signal means selectively yielding a series of distinct coded electrical signals for each desired one of said positions of said position means, said last mentioned electrical signals also all being of said polarity; comparing means comparing said two series of electrical signals on a digit to digit basis and producing error signals having said polarity but whose magnitudes are representative of differences between the actual position of said position means and the position corresponding to that dictated by said command signal means; and translation means coupled to said motor control means for controlling operation thereof in accordance with said error signals, said translation means including a transistor amplifier having a series of nulling circuits in its input, said nulling circuits sequentially detecting coincidence between said two series of electrical signals as the position of said position means approaches the position dictated by said command signal means.

7. A nulling arrangement for nulling on a group by group basis two signals each of a type including a plurality of distinct informational groups comprising: first means to be conditioned; position means coupled to said first means yielding a signal of said type which is indicative of the condition of said first means; a single source of potential; means in said position means coupled to said source of potential for converting said signals into electrical analogs wherein each group is translated into a single polarity potential whose magnitude is representative of the information in its related informational group; command signal means yielding an electrical analog corresponding to a desired condition of said first means; nulling means coupling said position means and said command signal means and comparing the magnitudes of the potentials between respective informational groups of said analogs, said nulling means including a pair of transistors having cross connected input circuits for rendering said transistors conductive on a mutually exclusive basis and developing error signals representative of differences between said analogs; and translation means for conditioning said first means in accordance with said error signals until said error signals disappear, whence the condition of said first means corresponds to the desired condition dictated by said command signal means.

References Cited by the Examiner

UNITED STATES PATENTS

| | | | |
|---|---|---|---|
| 2,630,481 | 3/1953 | Johnson | 318—28 X |
| 2,630,552 | 3/1953 | Johnson | 318—28 |
| 2,840,771 | 6/1958 | Kamm | 318—28 |
| 2,885,613 | 5/1959 | Myracle et al. | 318—28 |
| 2,969,490 | 1/1961 | Anderson et al. | 318—162 |

JOHN F. COUCH, *Primary Examiner.*